INVENTORS
Alfred Bril
Pieter Zalm
Hendrik Anne Klasens
BY
AGENT

United States Patent Office 2,754,444
Patented July 10, 1956

2,754,444
CATHODE-RAY TUBE COMPRISING FLUORESCENT SCREEN

Pieter Zalm, Alfred Bril, and Hendrik Anne Klasens, Eindhoven, Netherlands, assignors to Hartford National Bank and Trust Company, Hartford, Conn., as trustee Application April 30, 1952, Serial No. 285,202

Claims priority, application Netherlands June 16, 1951

3 Claims. (Cl. 313—92)

This invention relates to cathode-ray tubes comprising screens which contain one or more blue and ultra-violet luminescent cerium-activated materials. Furthermore the invention concerns apparatus, comprising such a cathode-ray tube, for the transmission of films or diapositives by television.

For cathode-ray tubes comprising a luminescent screen it is sometimes necessary that the luminescent material exhibits fluorescence having a very short decay time, for example when using a cathode-ray tube as a source of light in apparatus for televising films or diapositives (in British and U. S. literature termed flying-spot scanners). In such apparatus, an image is illuminated point by point by the light issued from a rapidly shifting light spot which is produced on the luminescent screen of a cathode-ray tube by the travelling electron beam which forms a raster on the screen. The light traversing the image is collected by a photo-cell and transformed into an electric current. The value of this current naturally depends upon the degree of transparency of that part of the image which is struck by the light. Of course, only a single point of the image must be struck by the light, since otherwise the photo-cell current would not depend solely upon the transparency of the image at the point to be reproduced. Consequently, only that point of the fluorescent screen which is struck by the electron beam must emit light and even the last preceding point of the luminescent screen should be fully extinguished. Hence, the decay time of the fluorescent of the luminescent material must be shorter than the time during which the light spot is shifted by one complete diameter. In practice, this means that the extinction time is required to be shorter than $10^{-6}$ sec.

As a luminescent material for this use blue and ultra-violet luminescent zinc oxide having a decay time of approximately $10^{-7}$ sec. has hitherto been used. However, this material has a limitation in that it has only a low efficiency. Moreover, the oxide has a considerable self-absorption which further detracts from the efficiency. In order to reduce the influence of the last-mentioned factor, the thickness of the luminescent layer could be reduced, but this has the disadvantage that the uniformity of the layer is jeopardised. This high uniformity is a stringent requirement, lest different parts of the image be irradiated with different luminous intensities.

As an alternative, use may be made of blue and ultra-violet luminescent phosphates of one or more alkaline earth metals and one or more alkali metals comprising cerium in trivalent form as an activator. As a rule such materials yield satisfactory results, but they suffer from the disadvantage that their emission extends fairly far in the ultra-violet part of the spectrum, which necessitates the use of special species of glass for the discharge tubes containing said materials and for the optical system employed for projection, in order to secure satisfactory transmission of the radiation produced in the luminescent screen.

Furthermore it is known to use a cerium-activated silicate of calcium and magnesium. This material suffers from the same disadvantages as referred to in connection with the phosphates.

According to the invention a cathode-ray tube comprises a luminescent screen which contains a blue and ultra-violet luminescent material, activated by trivalent cerium, having a decay time of the fluorescence shorter than $10^{-6}$ sec., which material is crystallised fired reaction product containing silicon, oxygen, one or more alkaline earth metals and, if desired, aluminum, the said elements being available in such quantities that the material can be symbolically represented by a point within a domain ABCDE in the ternary system

(M representing the sum of the alkaline earth metals), which domain is bounded by the straight lines AB, BC, DE and EA, the mol. ratios of the oxides MO, $Al_2O_3$ and $SiO_2$ at the corner points A, B, C, D and E respectively being:

(A)          $3MO.0Al_2O_3.1SiO_2$
(B)          $11MO.6Al_2O_3.3SiO_2$
(C)          $7MO.9Al_2O_3.4SiO_2$
(D)          $2MO.5Al_2O_3.13SiO_2$
(E)          $9MO.0Al_2O_3.11SiO_2$

The term alkaline earth metals is here to be understood to mean only the elements calcium, strontium and barium.

The cerium content is preferably chosen between 0.05 and 10 mol. per cent averaged over the total quantity of alkaline earth oxides.

The aforesaid materials, employed in a discharge tube in accordance with the invention, have little self-absorption, an energy yield 10 to 30 times as high as that of blue luminescent zinc oxide and, on excitation by electrons, an emission of from 3500 to 5000 A. with a maximum at 40000 to 42000 A.

Excellent results are obtained with materials of the composition: $2CaO.Al_2O_3.SiO_2$ activated by 2 mol. per cent of travelent cerium and: $2SrO.SiO_2$ activated by 2 mol. per cent of trivalent cerium.

To be complete it is pointed out that, as is known, silicates of one or more of the metals calcium, strontium, barium and aluminium activated by trivalent cerium have a blue and ultra-violet radiation on excitation by electro-magnetic waves generated in a gas-discharge tube. Therefore, the use of a luminescent layer containing the said silicates in discharge tubes of this type has already come to be known. It was, however, not known that these materials are also capable of being excited by electrons and that they may be used for those purposes where blue and ultra-violet luminescent materials are required having a decay time shorter than $10^{-6}$ sec. on excitation by electrons.

The aforesaid apparatus for scanning of a film image or a diapositive has been chosen by way of example to explain the condition of a short decay time for certain luminescent materials, but it is self-explanatory that for other uses, for example in the field of radar and for facsimile, it may also be of great importance to have a material with decay time of the fluorescence shorter than $10^{-6}$ sec. which does not suffer from the disadvantages inherent in the aforesaid known materials. As an indication of the domain of the ternary system

Figure 1:
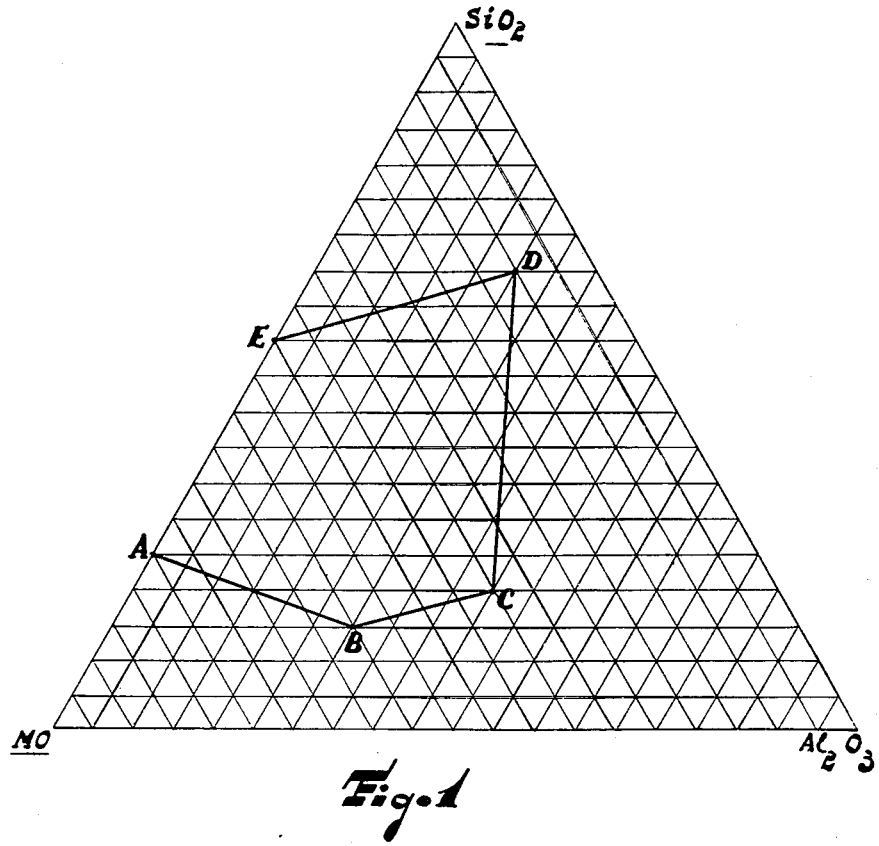
Figure 1 illustrates a ternary system of the materials employed.

which includes the materials employed in a luminescent screen for a discharge tube according to the invention, this domain is represented by the pentagon ABCDE in Fig. 1.

Figure 2:
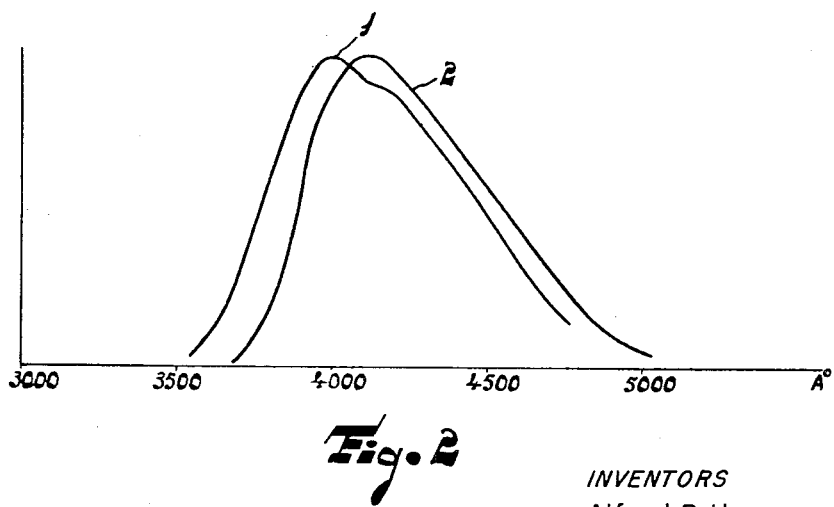
Figure 2 illustrates emission curves of several embodiments of the present invention.

Fig. 2 of the drawing shows two emission curves, the reference numeral 1 denoting the emission curve of electron-excited material of the formula $$2CaO.SiO_2.Al_2O_3:2\%$$

trivalent Ce, and the reference numeral 2 designating the emission curve of a material of the composition $$2SrO.SiO_2:2\%$$

trivalent Ce, the wavelength in A.-units being plotted on the abscissa and the intensity of the emission in arbitrary units being plotted on the ordinate.

Methods of producing the materials, whose emission curves are shown in Fig. 2, will now be explained by giving two examples.

*Example I*

Production of a material of the formula $2CaO.Al_2O_3SiO_2:2\%$ of trivalent Ce chemicals required:

20 g. of $CaCO_3$
75 g. $Al(NO_3)_3.9H_2O$
6.2 g. $SiO_2$
4 ccs. 1-n ceric nitrate solution ($10^{-3}$ g. ion Ce per cc.)

The aluminum nitrate is dissolved in 0.3 litre doubly distilled water to which the calcium carbonate, the silicon-dioxide and the ceric nitrate solution are subsequently added. The suspension is thoroughly mixed while heating and subsequently vapourised to dryness. The obtained dry powder is heated at 1250° C. for approximately two hours in a moist hydrogen atmosphere. The fired product is ground in a ball mill with the addition of water, the ground suspension is again vapourised to dryness and the dry material is again heated at 1250° C. for one hour in a moist hydrogen atmosphere.

*Example II*

Production of a material of the formula:

$2SrO.SiO_2:2\%$ of trivalent Ce chemicals required:

29.5 g. of $SrCO_3$
6.5 g. $SiO_2$
4 ccs. 1-n ceric nitrate solution ($10^{-3}$ g.-ion Ce per cc.)

A suspension is formed of the strontium carbonate, the silicon dioxide and the ceric nitrate solution in 0.2 litre of doubly distilled water and this suspension, after thorough mixing while heating, is vapourised to dryness. The obtained dry powder is heated at approximately 1300° C. for about two hours in a moist hydrogen atmosphere. The fired product is then ground in a ball-mill with the addition of distilled water, the ground suspension is vapourised to dryness and the dry material is again heated at approximately 1300° C. for one hour in a moist hydrogen atmosphere.

What we claim is:
1. A flying spot scanner comprising a cathode-ray tube, said tube comprising an electron gun and a luminescent screen responsive to electron bombardment comprising blue and ultra-violet luminescent material activated by about 0.05 to 10 mol. per cent of trivalent cerium, said material having a decay time of fluorescence of less than $10^{-6}$ sec., said material consisting of a crystallised fired reaction product of silicon dioxide, an oxide of an alkaline earth metal and aluminum oxide, said material being in the proportions at which the fired reaction product lies within a region of the ternary system $MO$—$SiO_2$—$Al_2O_3$ (M representing the alkaline earth metal) defined by lines AB, BC, CD, DE, EA, whose end points A, B, C, D and E are defined by the following compositions:

A. $3MO.0Al_2O_3.1SiO_2$
B. $11MO.6Al_2O_3.3SiO_2$
C. $7MO.9Al_2O_3.4SiO_2$
D. $2MO.5Al_3O_3.13SiO_2$
E. $9MO.0Al_2O_3.11SiO_2$

2. A flying spot scanner comprising a cathode-ray tube, said tube comprising an electron gun and a luminescent screen responsive to electron bombardment comprising blue and ultra-violet luminescent material activated by trivalent cerium, said material having a decay time of fluorescence of less than $10^{-6}$ sec., said material consisting of a crystallised fired reaction product of silicon dioxide, an oxide of an alkaline earth metal and aluminum oxide, corresponding to a composition $$2CaO.Al_2O_3.SiO_2.2 \text{ mol. percent}$$

of trivalent cerium.

3. A flying spot scanner comprising a cathode-ray tube, said tube comprising an electron gun and a luminescent screen responsive to electron bombardment comprising blue and ultra-violet luminescent material activated by trivalent cerium, said material having a decay time of fluorescence of less than $10^{-6}$ sec., said material consisting of a crystallised fired reaction product of silicon dioxide, and an oxide of an alkaline earth metal oxide, corresponding to a composition $2SrO.SiO_2:2$ mol. percent of trivalent cerium.

References Cited in the file of this patent

UNITED STATES PATENTS

| | | |
|---|---|---|
| 2,096,986 | Von Ardenne | Oct. 26, 1937 |
| 2,254,956 | Aschermann | Sept. 2, 1941 |
| 2,337,578 | Teal | Dec. 28, 1943 |
| 2,577,161 | Smith | Dec. 4, 1951 |

FOREIGN PATENTS

| | | |
|---|---|---|
| 896,651 | France | Feb. 28, 1947 |

OTHER REFERENCES

Article by Arthur L. Smith in the Journal of Electrical Society, pp. 287–296, November 1949.

"Preparation and Characteristics of Solid Luminescent Materials," published by John Wiley & Sons Inc., New York, 1948, pp. 306 and 307.